INVENTOR
MICHEL LEBLANC

Aug. 13, 1968  M. LEBLANC  3,396,632
VOLUMETRIC MACHINE SUITABLE FOR OPERATION AS
PUMP, ENGINE, OR MOTOR PUMP
Filed April 19, 1966  10 Sheets-Sheet 2
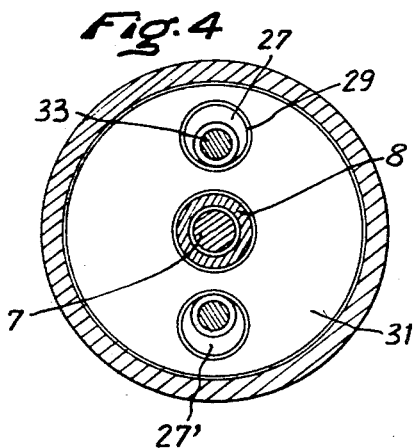
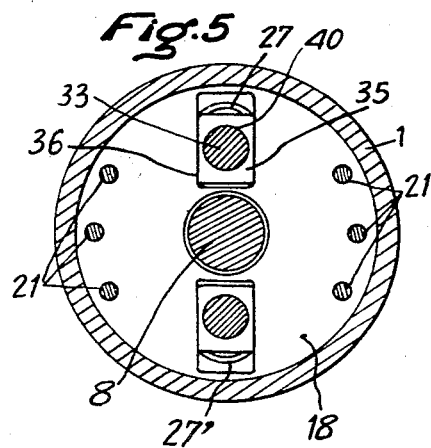
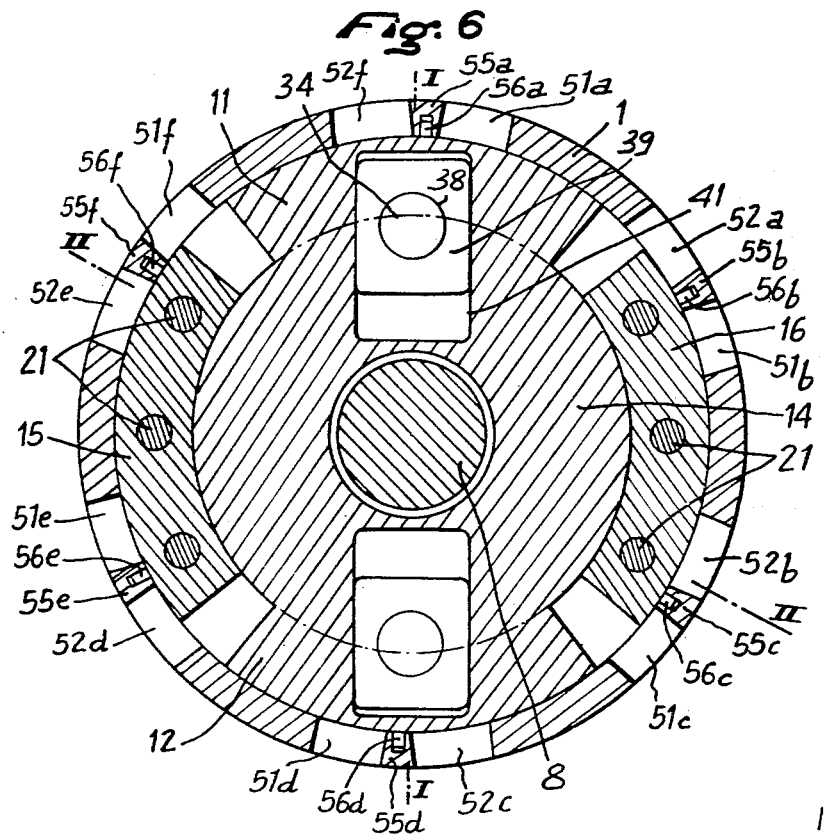
INVENTOR
MICHEL LEBLANC Aug. 13, 1968 M. LEBLANC 3,396,632
VOLUMETRIC MACHINE SUITABLE FOR OPERATION AS
PUMP, ENGINE, OR MOTOR PUMP
Filed April 19, 1966 10 Sheets-Sheet 3
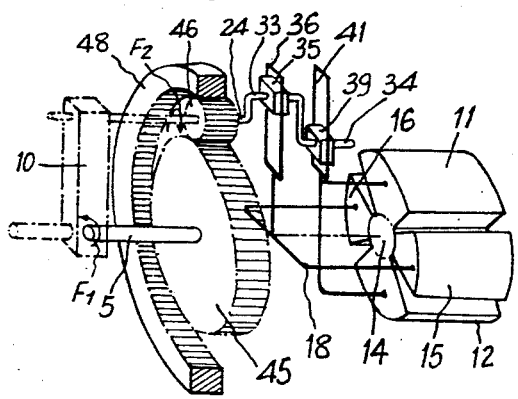
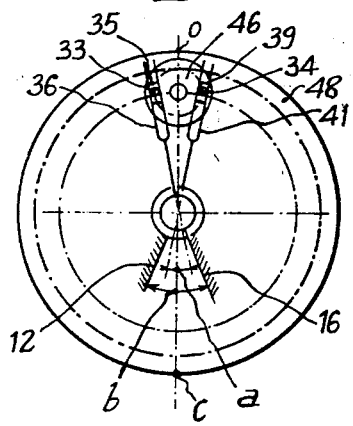
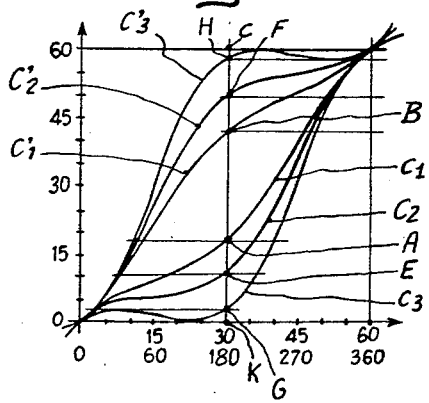
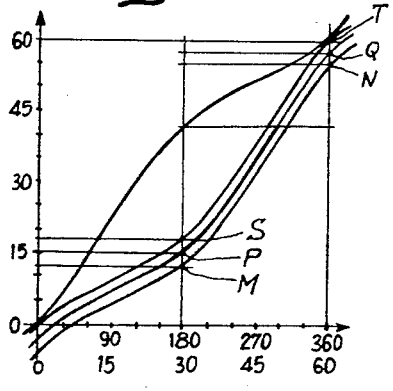
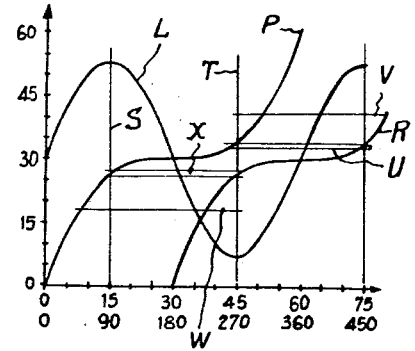
INVENTOR
MICHEL LEBLANC

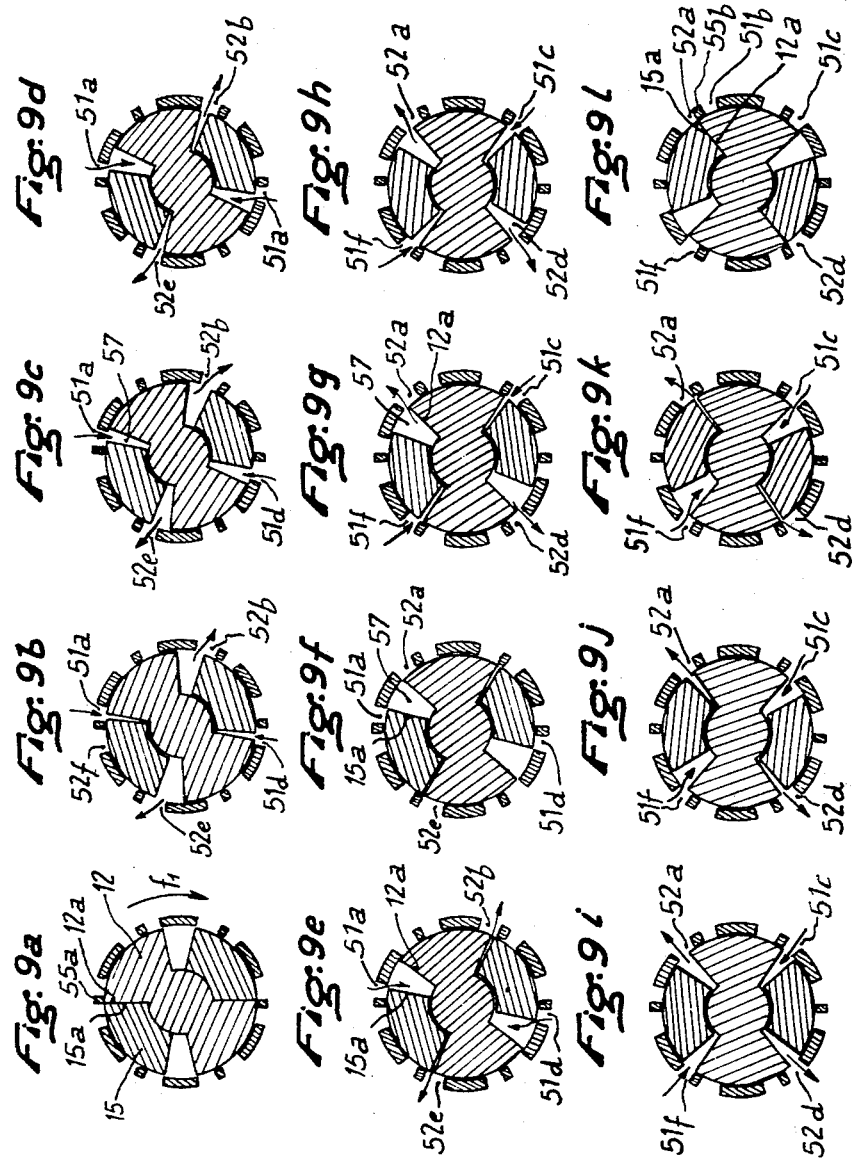

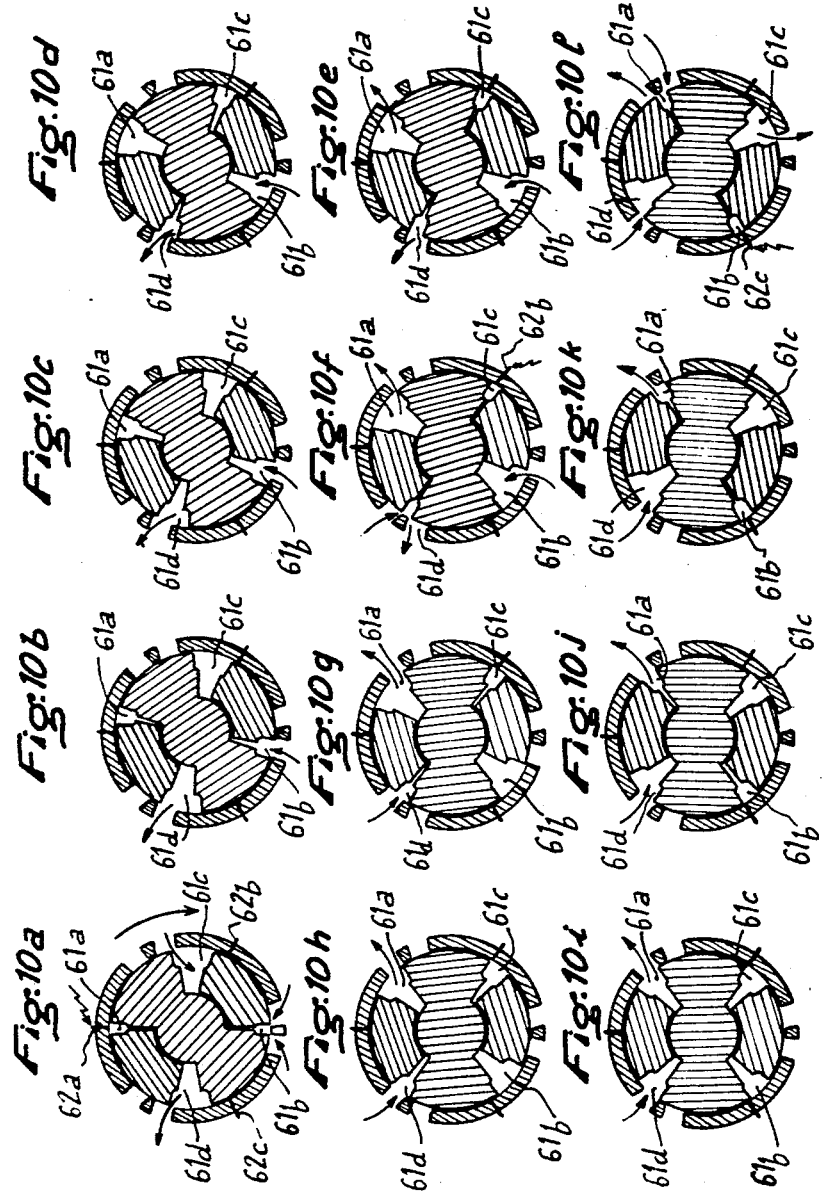

Aug. 13, 1968     M. LEBLANC     3,396,632
VOLUMETRIC MACHINE SUITABLE FOR OPERATION AS
PUMP, ENGINE, OR MOTOR PUMP
Filed April 19, 1966                    10 Sheets-Sheet 6
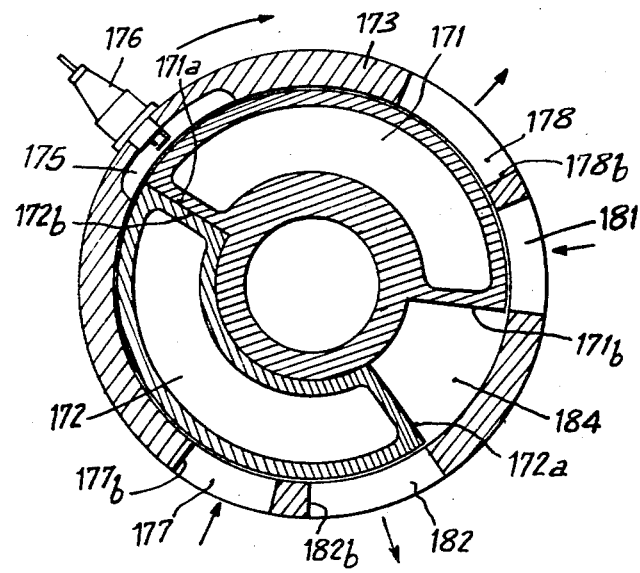
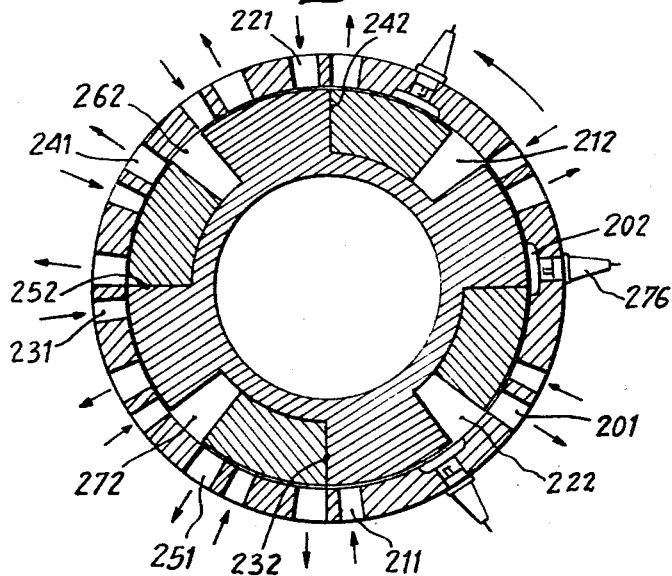
INVENTOR
MICHEL LEBLANC

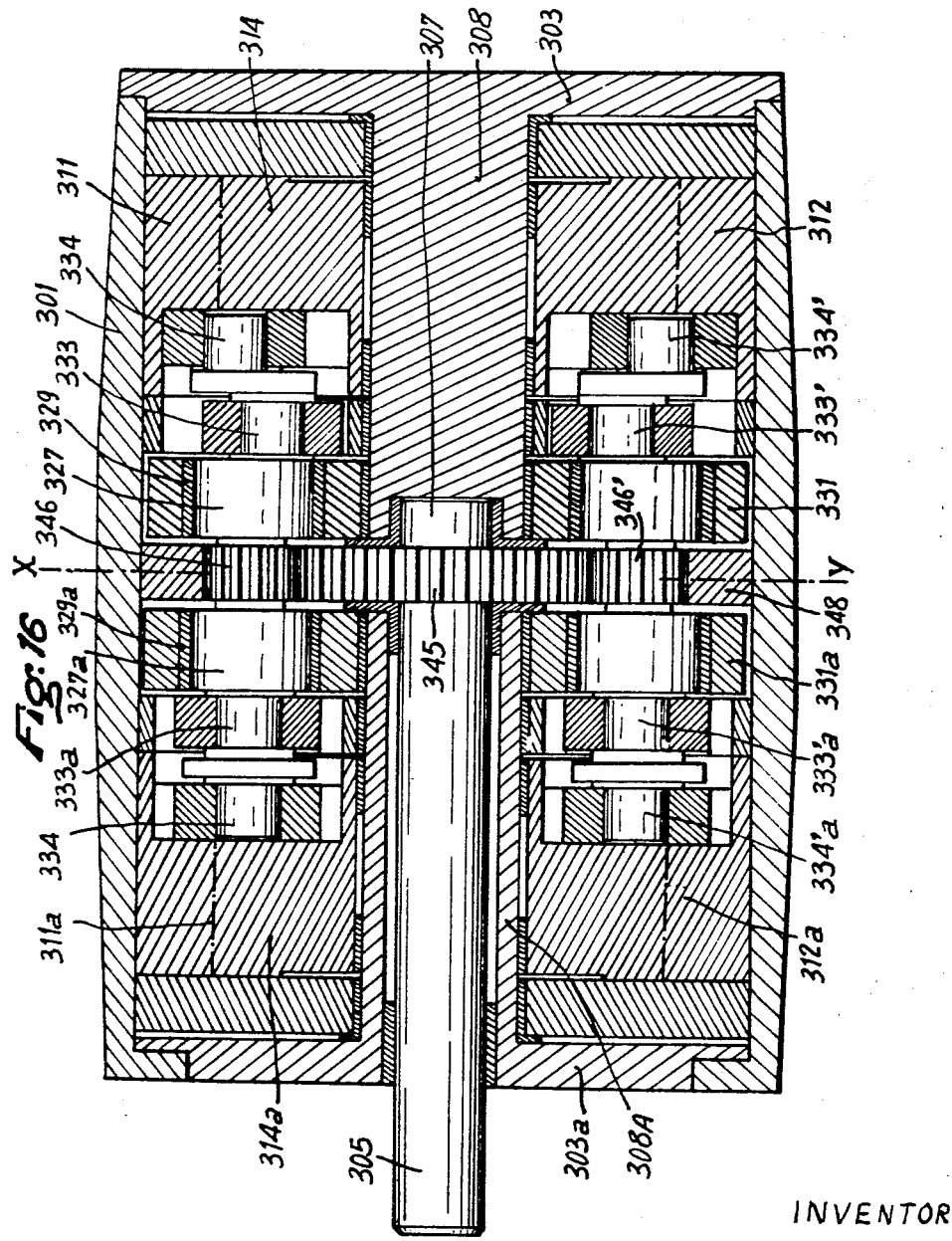

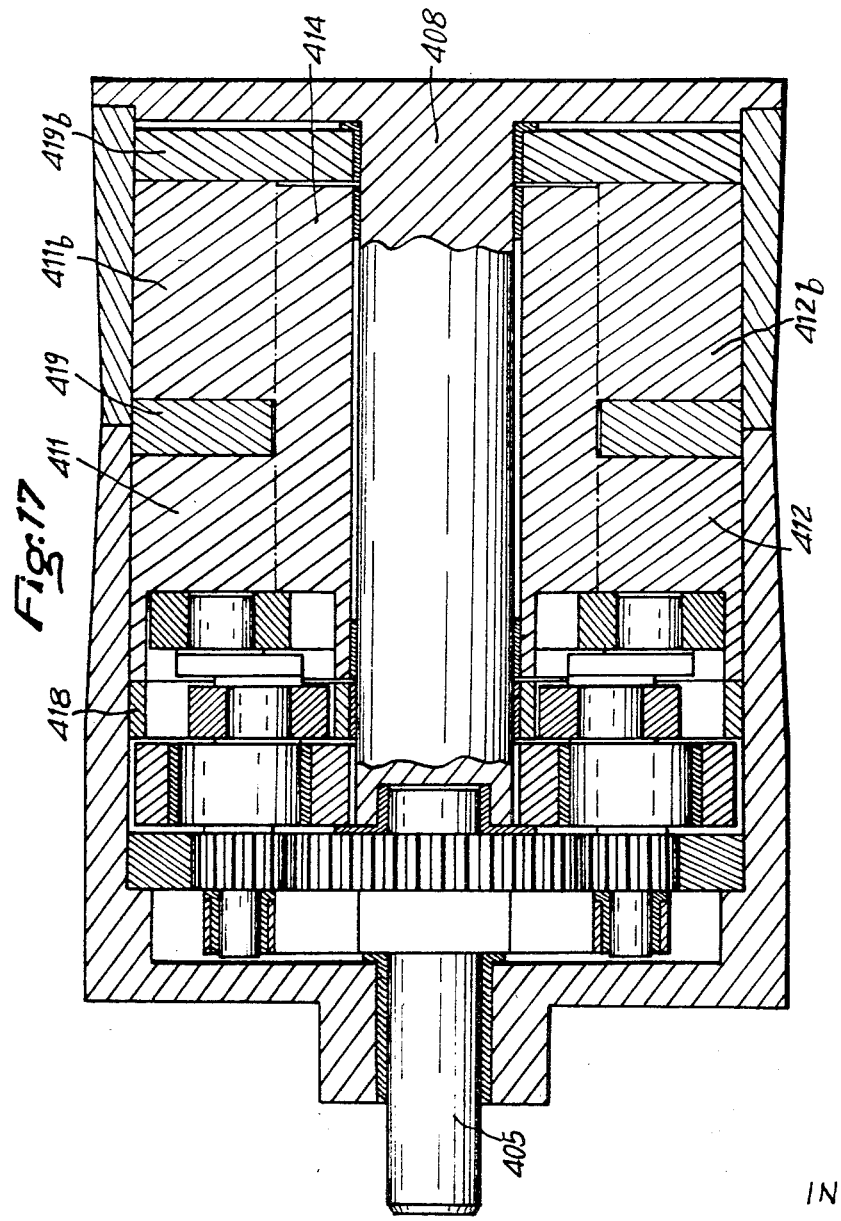

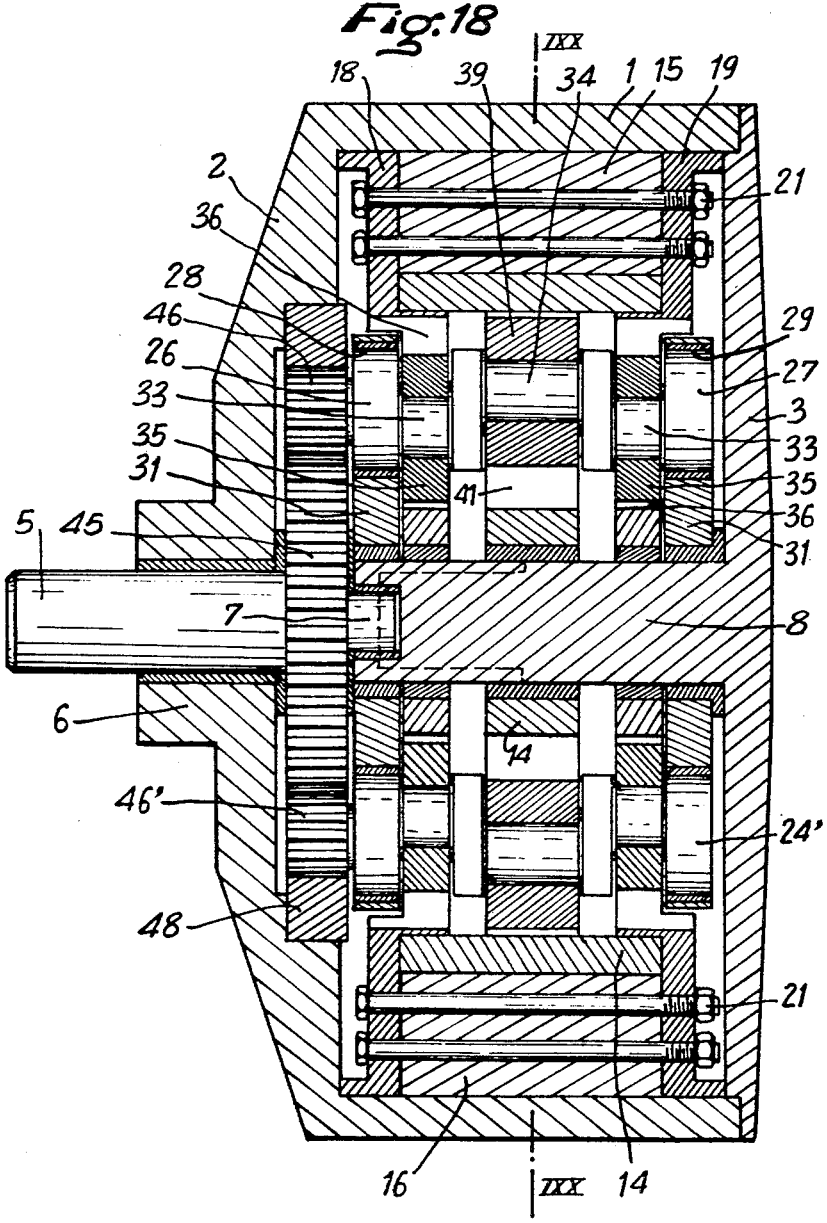

INVENTOR
MICHEL LEBLANC

United States Patent Office 3,396,632
Patented Aug. 13, 1968

3,396,632
VOLUMETRIC MACHINE SUITABLE FOR OPERATION AS PUMP, ENGINE, OR MOTOR PUMP
Michel Leblanc, 55 Rue des Hautes Bievres, Antony, Hauts-de-Seine, France
Filed Apr. 19, 1966, Ser. No. 543,591
9 Claims. (Cl. 91—60)

ABSTRACT OF THE DISCLOSURE

A rotary volumetric machine is comprised of a housing forming a cylindrically shaped chamber in which a pair of oppositely disposed angularly spaced sector-shaped first pistons are disposed in alternating arrangement with a pair of oppositely disposed angularly spaced sector-shaped second pistons. The combined angle formed by the four sector-shaped pistons is less than 360° whereby chambers are provided between the oppositely disposed surfaces of adjacent first and second pistons. The first pistons are secured to a core or sleeve rotatably mounted on a shaft within the chamber while the second pistons extend between a pair of plate-like members disposed transversely of and rotatable about the shaft. A pair of eccentrically arranged crank shafts are disposed within the chamber on diametrically opposed sides of its axis and the crank pins of the shafts are interconnected to the pair of first pistons and the pair of second pistons for rotating them about the shaft at relatively periodically variable speeds whereby the adjacent radially extending surfaces of the sector-shaped pistons are moved away from and toward each other forming therebetween piston chambers of periodically variable volume. Extending into the opposite end of the chamber from the shaft is another shaft having a planet gear thereon which meshes with planet pinions mounted on the crank shafts. In addition, the planet pinions engage internal teeth on a gear rim within the inner surface of the housing. A plurality of ports are provided in the housing to afford inlet and exhaust for the chambers formed between the pistons.

Summary of the invention

Figure 1:
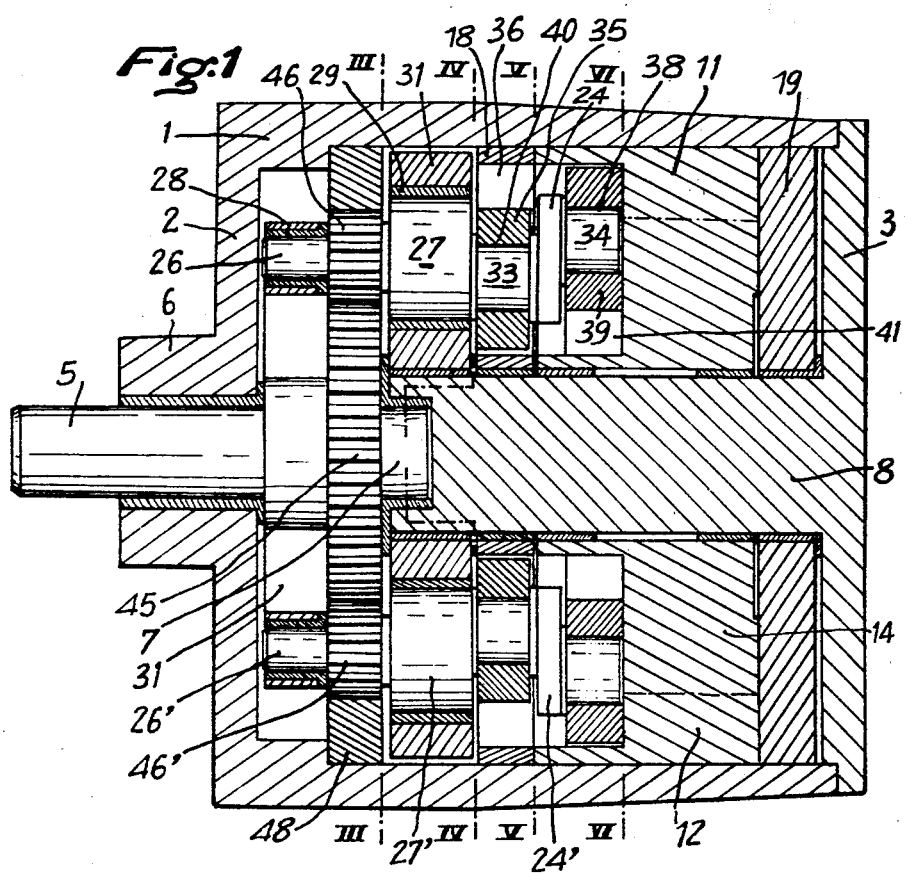

The invention relates to a rotary volumetric machine of a robust and very simple construction which can operate at excellent efficiencies as a liquid or gas pump, vacuum pump, compressor, hydraulic fluid driven engine, internal combustion engine, and in all the mutual combinations of such engines, whether by series connection or by the integration of combined engines in a single construction, and that for the most versatile applications such as the supply of hydraulic fluids, drive of organs, gas generators, hydraulic engines interconnected by hose lines, etc.

A characteristic of the machine according to the invention is that it comprises the following components: a stationary cylindrical gear case and an even number of pistons in the design of circular sectors, freely moving in two imbricated groups, independent of each other, and located between the bore of the gear case and a cylindrical core. The sum of the lengths of arc of all the pistons is less than 360°, so that operative chambers exist between the radial peripheries of the said pistons which communicate in an alternating cycle with intake and exit apertures, suitably dimensioned and positioned, and fitted in the cylindrical wall of the gear case. This takes place under the effect of a mechanical device comprising a disc which rotates in a coaxial sense within the gear case, and on which at least one auxiliary shaft is pivoted which carries, on the one side, a pinion or planet wheel engaging a gear, or a rim integral with the gear case, and, on the other side, two components which are off-centre by a particular measurement and in diametral opposition or connection, respectively, to the even number pistons and the odd number pistons in such a manner that, with a constant rotation speed of the aforementioned disc, the piston groups rotate at a varying speed that tends towards a sinusoidal pattern, and consequently, the volume of the operative chambers which are combined as to their passage by the apertures of the gear case, varies in a periodic cycle.

According to another characteristic of the invention, the periphery of the gear case is subdivided into a number of base arcs which equals the ratio of the gear rim diameter to the diameter of the planet wheel and, in the case of a pump, each base arc is fitted in succession with an intake aperture, a solid part and an exit aperture of an elementary pump, a cycle that corresponds to the dimension of the said arc; whereas in the case of an engine, two successive base arcs, corresponding to an elementary engine, are fitted with a first base arc and a second base arc, the first being formed by an intake aperture followed by a solid part, and the second being formed by a solid part followed by an exit aperture, a cycle which covers the whole of the first and the second base arc, in which case the position of the minimum volume corresponds to the junction point of these two arcs.

In the case of a full lift and force pump, the angle of the apertures, according to a further characteristic of the invention, is equal to half the base arc less half the maximum variation of the angle between two pistons.

Another characteristic of the invention is that, in the case of an engine with an infinite compression ratio, the angular value of each piston equals $n$ times ($n=0$, 1, 2, 3, etc.) the base arc plus half this base arc, less half the maximum variation of the angle between two pistons.

The study of the following description and the attached drawings, which show some constructional examples of rotary volumetric machines according to the invention, will help to better understand the invention, which shall not be confined to the constructional examples shown.

Figure 2:
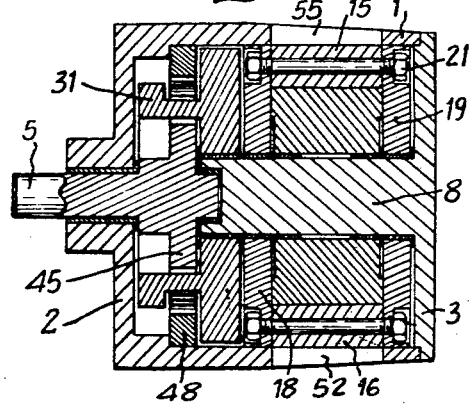
Figure 3:
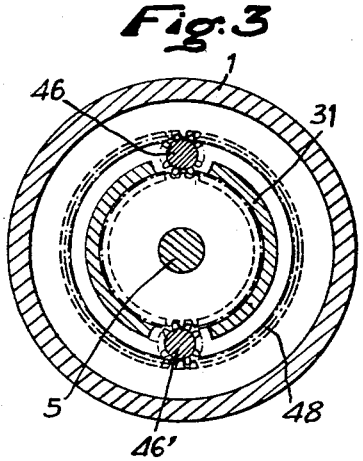
Figure 19:
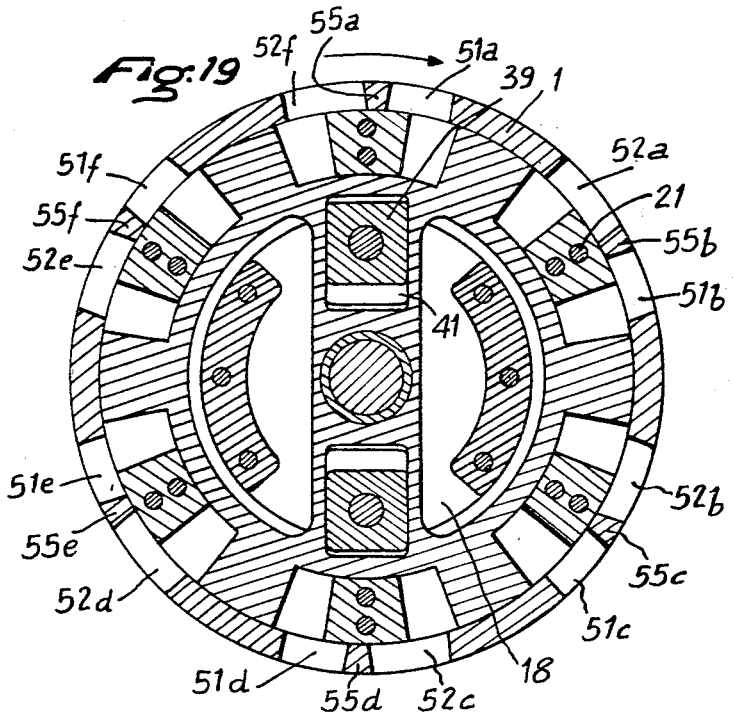
Figure 20:
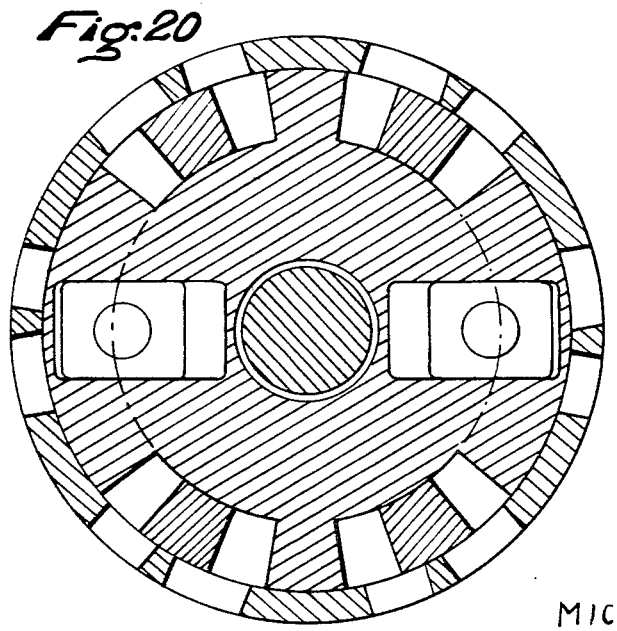

In these drawings,
FIG. 1 gives a longitudinal section following the line I—I of FIG. 6, of a rotary pump according to the invention,
FIG. 2 shows a longitudinal section of the same pump following the line II—II of FIG. 6,
FIGS. 3 to 6 show cross sections following, respectively, the lines III—III, IV—IV, V—V, and VI—VI of FIG. 1,
FIG. 7 gives a perspective diagram of the kinematics of the pump shown in FIGS. 1 to 6,
FIG. 8 is a partial end view of the same kinematics,
FIGS. 9a to 9l show in a diagrammatic presentation the successive stages of an operating cycle of the pump shown in FIGS. 1 to 8,
FIGS. 10a to 10l give a diagrammatic view of the operating cycle of an internal combustion engine derived from the pump shown in FIGS. 1 to 8,
FIG. 11 is a graph showing the operating cycle of the rotary pump according to FIGS. 1 to 8,
FIG. 12 is a graph showing the operating cycle of an alternative of the pump according to FIGS. 1 to 8,
FIG. 13 is a graph showing the operating cycles of the engine according to FIGS. 10a to 10l,
FIG. 14 gives in a cross section in right angle of the pistons, a view of a combined motor pump engine,
FIG. 15 is again a cross section in right angle of the pistons, showing an alternative of the combined motor pump engine according to FIG. 12,
FIG. 16 gives a longitudinal section of a double-acting engine, FIG. 17 gives a longitudinal section of an alternative constructional example of a double-acting engine, FIGS. 18 and 19 give longitudinal and cross sections following the line XIX—XIX, of an alternative constructional example of the engine according to FIG. 1 and FIG. 20 shows in a cross section an alternative of FIGS. 6 and 19.

It will be noted that the engines shown in FIGS. 1, 14, 15, 16, and 17 are of the type in which each piston has an angular value that is equivalent to a base arc plus half an arc less half the value of the maximum variation of the angle between two pistons. The engine of the FIGS. 18 and 19 is of the type in which each piston has an angular value that is equivalent to half a base arc less half the value of the maximum variation in the angle between two pistons (in this case $n=0$). The rotary pump shown in the diagrammatic views of FIGS. 1 to 6 comprises a sealed stationary cylindrical gear case 1 which, at one side, is fitted with a bottom 2 and, at its other side, is closed by a flange 3. A main centre shaft 5 is pivoted in a hub 6 of the bottom 2, and is centered at its inward end 7 in a respective cylindrical joggle-joint which is arranged at the end of a pivot 8 secured to the flange 3; this pivot is cylindrical and is in coaxial position in regard to the interior of the cylindrical gear case 1.

The pump comprises a certain even number (in the example, four) of pistons in the design of sectors of a cylindrical ring, which are subdivided into two imbracated groups; two of these pistons, viz., pistons 11 and 12, are fixed to a cylindrical-core 14 which rotates on the pivot 8, whereas the two other pistons 15 and 16 are in the form of bracing struts which are arranged by means of stay bolts 21, between two discs 18 and 19 which rotate on the pivot 8.

As an alternative, one can use the bore of the cylindrical gear case 1 in place of the pivot 8, in which case a disc 31 rotates on the inward end of the shaft 5.

The assembly formed by the pistons 11 and 12 and the core 14, because of the moment of inertia, has the same total of mass as the assembly formed by the pistons 15 and 16 and the discs 18, 19.

The outer diameter of all pistons is such as to ensure their free rotation within the bore of the cylindrical gear case 1. The inner diameter of the two pistons 15 and 16 is such that they can freely pivot against the cylindrical surface of the core 14. The length of the generating unit of the assembly, i.e., pistons 11–12, core 14, is such that this assembly can freely pivot between the discs 18–19. In the demonstrated example, the four pistons correspond to arcs of the same length, and their total is less than 360°, so that the two pistons 15 and 16 can pivot in relation to the two pistons 11 and 12.

The piston couple 11, 12 and the piston couple 15, 16 are driven to rotate in the gear case 1 at a periodically variable speed, a variation that tends towards a sinusoidal pattern as is described below and which is achieved by means of a system composed of two identical crank shafts 24, 24'. Each of these, for instance the crank shaft 24, is mounted in two cylindrical bearings 26, 27 which rotate in the respective bores 28, 29 of the disc 31 which, in turn, rotates on the pivot 8 and is of a special longitudinal profile, the configuration of which will become quite clear in connection with the FIGS. 1, 2, and 4. This crank shaft is fitted with two crank pins 33, 34, which are in diametral opposition to each other and off the axis; the crank pin 33 rotates in the bore 40 of a rectangular frame 35 which can yield into a radial opening 36 in the disc 18 which is secured to the two pistons 15, 16 (FIG. 5), whilst the other crank pin 34 rotates in the bore 38 of another rectangular frame 39 which can radially yield into an opening 41 arranged in the assembly that is formed by the core 14 and the piston 11.

The crank shaft 24 as the crank shaft 24' are driven to rotate around the general axis of the gear case, by a system which is composed of a planet gear 45 meshing with two planet pinions 46, 46', which are integral with the two crank shafts 24, 24' and these, in turn, engage with the internal teeth of a gear rim 48 that is integral with the gear case 1. As an alternative, one can also drive the planet pinions directly by their shafts which are in a bearing that is integral with the shaft 5, and do without the planet gear 45 as is indicated by the dash-dotted lines at 10 in FIG. 7. In the present constructional example, comprising four pistons, the ratio of the diameter of the internally engaging gear rim 48 to those of the planet pinions 46 and 46' is 6:1. The cylindrical surface of the gear case is fitted with six intake apertures 51a, 51b, 51c, 51d, 51e, 51f, and exit apertures 52a, 52b, 52c, 52d, 52e, 52f. Between the apertures 51a and 52f, 51b and 52a, 51c and 52b, 51d and 52c, 51e and 52d, 51f and 52e, respectively partitions 55a, 55b, 55c, 55d, 55e, 55f are arranged which are fitted with flat segments 56a, 56b, 56c, 56d, 56e, 56f. One will revert, further below, to the interrelation that exists between the number of the apertures, the number of the pistons, and the ratio of the gear diameters as well as the specific positioning and the angle values of these apertures.

FIGS. 7 and 8 show in a very simplified diagrammatic view the kinematics of the pump. In these figures, the same reference characters have been used for the same components as those shown in the FIGS. 1 to 6.

As the shaft 5 is driven to rotate in the direction of the arrow $f1$, the planet gear 45 causes the two planet pinions to rotate in the same direction and engage with the internal toothing of the rim gear 48, in particular the planet pinion 46, in such a way that this pinion rotates around its own axis in the direction of the arrow $f2$, i.e., the direction opposite to the arrow $f1$. The rotor formed by the assembly of the four rotary pistons 11, 12 and 15, 16 is thus driven to rotate as a whole inside the gear case 1, but the rotary movement of the crank shaft 24, carrying the crank pins 33, 34, ensures an essentially sinusoidal varaition in the angular velocity of the two pistons 15, 16, on the one hand, and 11, 12, on the other hand; this angular velocity is out of phase by 180° of the rotation of the planet pinion around its axis as related to the rotation of the pistons 15, 16, so that the distance between the radially peripheral faces of the two pistons 15, 16 and the two pistons 11, 12 varies likewise in an essentially sinusoidal pattern during the rotation of the entire piston assembly in the gear case. It is the variation in volume of the four chambers thus formed between the radial faces of the pistons that is applied to ensure the intake and the lift of a fluid, in order to make it circulate or compress it, or even more to unstress it. In the case of the oil pressure pump, the leakage effect creates a counter-pressure in the sealed gear case. One can also envisage the construction of a vacuum pump, the tightness of which would be ensured by the circulation of oil between the gear case and the operative chambers.

The engine is symmetrical in its axial direction so that all its components are balanced and the transmission ratio applied to one of its planet pinions and the crankshaft driven by the same, can be repeated with other planet pinions driving other crankshafts.

When the plane of the two crank pins 33, 34 is vertical to the diameter OC (FIG. 8) of the gear case and intersects the axis of the planet pinion 46 on this crankshaft, the angle in the centre described by the radial axis of the two operative piston frames 35 and 39 is at maximum and equals $a$; two radial faces of the one piston couple are in contact, for instance, with the two adjacent faces of the other piston couple, whilst the other radial faces of these pistons are at their maximum spacing apart from each other and form, between each other, an angle $b$. When the planet pinion 46 has completed half a revolution on its rotation around its axis on the internal toothing of the gear rim 48, the relative positions of the two operative piston frames 35 and 39 are inverted, in other words, during this semicircular course, the angle *a* will be reduced to zero and will then regain the original quantity in the opposite direction, so that the pistons will have completed a relative swivel movement, the amplitude of which is twice the quantity of the angle *a*; i.e. the angle *b* equals 2*a*. One can also construct an alternative engine in which the angle *b* is smaller than 2*a*, and the difference (2*a*−*b*) is compensated by a flexible device incorporated in the frame/radial aperture system, or the like. In this case, the compression ratio is infinite and not affected by the wear to which the engine is subjected.

A complete cycle, at the end of which the pistons have returned into their original relative positions, is thus effected whenever the planet pinion 46 has completed a revolution around its own axis on its course on the internal toothing of the gear rim 48, in other words, when its axis has shifted by an angle of 60° in the centre inside the stationary gear case 1 of the engine, following the above theories.

Such a cycle is shown in a diagrammatic view in FIGS. 9*a* to 9*l*. In FIG. 9*a*, the radial face 12*a* of the piston 12 is in contact with the radial face 15*a* of the piston 15 in right angle to the upper edge of the partition 55*a* which separates the exit apertures 52*f* from the intake aperture 51*a*. The piston assembly as a whole rotates in the direction of the arrow *f*1. The two faces 12*a* and 15*a* of the two pistons in question part from each other as they move past the intake aperture 51*a* (FIG. 9*b*). The operative chamber 57 that is built up between these two faces increases progressively in volume, according to a law of sinusoidal tendency, as shown in the FIGURES 9*c*, 9*d*, 9*e*, 9*f* and in the position shown in FIG. 9*f*, the face 15*a* reaches the lower edge of the intake aperture 51*a* which is thus closed.

The operative chamber 57 is now fully closed, the rotation continues and as the face 12*a* of the piston 12 passes beyond the upper edge of the exit aperture 52*a* (FIG. 9*g*), the volume of the chamber 57 decreases progressively and the fluid that it contains escapes through the exit aperture 52*a* (FIGS. 9*h*, 9*i*, 9*k*, 9*l*). The faces 12*a* of the piston 12 and 15*a* of the piston 15 are again in contact against each other and disposed at a right angle to the upper edge of the partition 55*b* which separates the exit aperture 52*a* from the intake aperture 51*b*. Again the exit aperture 52*a* is completely closed. The first cycle is completed and, as one will remember, corresponds to one revolution of the planet pinions around their own axes and a shift of ⅙ of their course around the axis of the gear rim integral with the pump case.

During this first complete cycle of suction through the intake aperture 51*a*, and exhaust through the exit aperture 52*a*, an identical cycle of suction takes place through the aperture 51*d* (FIGS. 9*a* to 9*f*), together with the corresponding exhaust through the aperture 52*d* (FIGS. 9*g* to 9*l*).

In the course of the same cycle one has assisted, during its first half, i.e. during the suction phases described above, as a delivery phase takes place through the aperture 52*b* and an identical delivery phase occurs through the aperture 52*e* (FIGS. 9*a* to 9*f*), whereas during the second half of the cycle, i.e. during the delivery phases described above, a suction phase takes place through the aperture 51*c* and an identical suction phase through the aperture 51*f* as demonstrated in the FIGS. 9*g* to 9*l*.

Thus, in the course of one cycle, four suction and four delivery phases have been produced, in other words "four pulsations." With one complete revolution of the total piston assembly in the gear case of the pump, the planet pinions rotate six times around their axes, so that six cycles are effected and, consequently, twenty-four pulsations, evenly distributed between the six exit apertures, have been produced; at each exit aperture, there are four pulsations per each complete revolution of the rotor assembly, and the same applies to the intake apertures, so that there are four pulsations per each pump unit.

Depending on the configuration selected for the fluid collectors for the intake and the delivery, the flow capacity of a basic pump unit available at the exit aperture can be either kept separate or added to the flow capacity of other basic pump units; further this flow can be injected through the intake aperture of another or other basic pump units and vice versa.

The useful surface of the apertures at a given moment differs from the geometric surface of the openings arranged in the wall of the cylindrical gear case, and is equal to the difference between this geometric surface and that part of this geometric surface which is obstructed by the pistons in their continuously varying movement.

The variation in volume of each operative chamber tends to be sinusoidal in character; the changes in the useful surface of the respective aperture follow an almost identical principle, and the ratio of the instantaneous flow to the instantaneous surface of the respective aperture remains basically constant, which provides a favourable condition for a good flowing of the fluids in view of the variation in speed of the pistons. When reversing the direction of rotation of the shaft 5 is reversed, the direction of circulation of the fluid within the operative circuit is also reversed, provided a suitable location of the minimum volume position of the chambers is ensured, e.g. by an angular adjustment of the gear rim within the gear case by means of a setting device.

Plotted on the graph of FIG. 11 are, along the abscissa, from 0 to 360°, the rotation angles of the planet pinion 46 around is own axis, and, from 0 to 60°, the respective centre angles described by the shift of the axis of the said pinion around the axis of the engine, the latter being ⅙ of the former, and, on the coordinates, the positions of two faces relative to two adjacent pistons as expressed by angles from 0 to 60° in their assumed graduation over the gear case of the engine. The curves C1 and C′1 give the positions of the front edge of a piston and the rear edge of an adjacent piston in the course of a cycle, with an eccentricity of the crankshafts 33 and 34 as indicated by the angle *a* in FIG. 8, i.e. 12°.

The coordinate of point A gives the circumferential length of the intake aperture which equals half the value of the base arc less half the maximum variation of the angle between two sectors; the distance of the coordinates A and B corresponds to the maximum interspacing of the pistons and, consequently, the maximum volume of an operative chamber formed between two pistons, whereas the distance of the coordinates B and C gives the circumferential length of the exit aperture which equals half the value of the base arc less half the maximum variation of the angle between two sectors.

The maximum and the minimum volume positions of the chamber are apart from each other by 180° of rotation of the planet pinion around its own axis, i.e. 30° of shift of its axis around the axis of the engine. A cycle is completed with a rotation of the planet pinion by 360°, which is equivalent to a shift of the same by 60° around the axis of the engine.

When increasing the eccentricity of the crankshafts, e.g. angle *a*=20°, one obtains curves such as C2 and C′2, which permits an increase in the volume of the operative chamber as given by the distance EF, but the circumferential lengths of the intake and exit apertures are shortened to the lengths AE and B respectively.

For a yet larger eccentricity, e.g. angle *a*=28°, one obtains the curves C3, C′3, which would provide a yet larger volume of the operative chamber indicated by the distance GH, but the lengths of the intake and exit apertures would now be those represented by KG and HC.

The total useful angle described along the circumference of the crank case, with each revolution of the rotor, is 24 times the angle *b*, or 48 times the angle *a*.

The conditions described above are confined to an engine in which the compression ratio is infinite and the intake apertures are only open during the period of increase in the respective volumes, and the delivery apertures are only open during the period of reduction of the respective volumes.

Certain applications require engines of a limited compression; in this case, two radial faces of a piston couple are, for instance, at their minimum interspacing (denoted $x$) as they are in a position opposite to two adjacent faces of the other piston couple, whereas the other radial faces of these pistons are at their maximum interspacing $b$ plus $x$. When the planet pinion 46 has completed half a revolution around its own axis on the internal toothing of the gear rim 48, the pistons will have pivoted for a relative swivel movement, the amplitude of which equals $b$, and the compression ratio is defined by $$\frac{b+x}{x}$$

The graph of FIG. 12 is an alternative of the one in FIG. 11, viz, with an angle $b$ of 24°, and the angles $x$ of 5°, 2.5°, and 0°, which correspond to compression ratio of 5, 8, 10 and infinite; the coordinates of the points M, P, S, and N, Q, T, give the respective positions of the lower edges of the intake and exit apertures with closed position at the maximum and minimum volume for the three above mentioned compression ratios. The angular value of each sector is reduced by the value that corresponds to the differences inbetween the coordinates of the points S, M, and S, P, for the compression ratios 5, 8, and 10, respectively.

Certain applications require a sequence of operation in which the opening and closing moments of the intake and exit apertures are different from the ones just described. One delays or advances the opening or closing moment of the intake or exit apertures by increasing or reducing the value of the coordinates of the points which mark the "upper" and "lower" edges of the said apertures. In the case of a vacuum pump, where the discharge begins following the dead point of the maximum volume, valves initiate the evacuation in the crank case, of the oil which has entered the operative chambers.

Since a full cycle must be completed within an arc of 60° of the pump case, the total sum of the circumferential lengths of the intake aperture of the operative chamber and the exit aperture must be at most equivalent to 60°, inasmuch as partitions are required, e.g. the partition 55a (FIG. 6) which separates the exit aperture 52f from the intake aperture 51a; the upper edge of this partition at the side of the exit aperture is in a right angle to the minimum volume position and the lower edge of the exit aperture 52f.

In general terms, the number of the pistons of the pump, the ratio of the diameters of the gear rim 48 to the diameter of the planet pinions 46, the number of intake and exit apertures, and the number of pulsations per complete revolution of the piston assembly in the crank case, are given by arithmetic progressions according to the following table:

| | | | | |
|---|---|---|---|---|
| Total number of pistons | 2 | 4 | 6 | 8 |
| Ratio gear rim:planet pinion | 3 | 6 | 9 | 12 |
| Number of intake apertures | 3 | 6 | 9 | 12 |
| Number of exit apertures | 3 | 6 | 9 | 12 |
| Number of basic pump units | 3 | 6 | 9 | 12 |
| Number of pulsations of a basic pump unit per revolution of the rotor | 2 | 4 | 6 | 8 |
| Total number of pulsations per revolution of the rotor | 6 | 24 | 54 | 96 |

The same engine can, of course, assume the function of a receiver engine when it is driven by hydraulic fluid; in this case, a torque is applied to the shaft 5, in on direction or the other, depending on the direction in which the fluid is circulated in the engine, and care must be taken to ensure the angular adjustment of the gear rim 48 in relation to the crank case 1, in order to arrange the minimum volume position of the respective chamber in right angle of the lower edge of the aperture that is assumed as the exit aperture.

According to an analogous principle, the engine can be converted into an internal combustion engine, such as the example given in FIGS. 10a to 10l. This constructional example differs essentially from the described pump, in so far as the compression ratio is of a suitable finite value due to the existence of a combustion chamber 61, formed by the cavity in the two faces in respect of two adjacent pistons, and spark plugs 62a, 62b, 62c are suitably arranged on the periphery of the crank case, spaced at 120° from each other, and taking the place of the aperture groups 52f and 51a, 52b and 51c, 52d and 51e of FIG. 6. For a complete revolution of the planet wheels around their own axis, i.e. ⅙ of their rotary course within the crank case of the engine, the following details will be noted: the ignition of the fuel gas confined in the chamber 61a (FIG. 10a), the expansion phase (FIGS. 10b, 10c, 10d), the beginning of the exhaust (FIG. 10e), the continuation of the exhaust (FIGS. 10f, 10g, 10h, 10i, 10j, 10k), and the end of the exhaust (FIG. 10l). The demonstrated operation is composed of two strokes, a first stroke of expansion or power transmission to the shaft 5, and a second stroke of exhaust. During the same period of operation, a suction phase (FIGS. 10a to 10f) and a compression phase (FIGS. 10g to 10l), accomplished at its end by the ignition, as shown in FIG. 10l, have taken place in the chamber 61b.

With one revolution of the pinion one has thus performed, in the chamber 61a, a motive or expansion phase and an exhaust phase, and in the chamber 61b, a suction phase and a compression phase, and in the chamber 61c, a compression phase and a decompression phase, the ignition taking place as shown in FIG. 10f, and, finally, in the chamber 61d, an exhaust phase and a suction phase.

In FIG. 13, L denotes the variations in volume of a chamber, P and R denote the position of the rear edge and the front edge, respectively, of the pistons as they withdraw from or obstruct the apertures, the lines S and T represent the ordinates of the maximum and minimum volume positions of the chambers, and U, V as well as W, X, indicate the location of the upper and lower edges of the intake and exit apertures. The graph shows the possibilities of subdividing the intake and exhaust periods required by the operation of the conventional engines, as well as the angular values of the pistons. The interrelations of the various components, in the case of a conversion into a driving engine, correspond to the arithmetic progressions of the following table:

| | | | | |
|---|---|---|---|---|
| Number of pistons | 4 | 8 | 12 | 16 |
| Ratio gear rim:planet pinions | 6 | 12 | 18 | 24 |
| Number of intake apertures | 3 | 6 | 9 | 12 |
| Number of exit apertures | 3 | 6 | 9 | 12 |
| Number of explosions per revolution of rotor | 12 | 48 | 108 | 192 |
| Number of spark plugs | 3 | 6 | 9 | 12 |

It is possible, of course, to fit sealing segments and a circulation system for a cooling fluid inside the pistons and the crank case.

FIG. 14 shows, in a cross section at a right angle to the pistons, a combined engine in which the operative chambers assume in succession the functions of a combustion chamber, of an internal combustion engine, and the chamber of a pump or a compressor. In the constructional example demonstrated, this engine comprises only two pistons 171, 172, which rotate inside a cylindrical crank case 173 and are connected to each other, as in the engines described above, by a kinematic system including at least one planet pinion which rotates on the internal toothing of a gear rim integral with the crank case, the diameter of the planet pinion, in the case of the present example, being one third of the rim diameter. The combustion chamber 175 is fitted with a spark plug 176. The symbols 177 and 178 denote the intake and exit apertures of the engine, and 181, 182 denote the intake and exit apertures of the pump. With the position in which the engine is shown, the first phase to take place is a phase that begins with the bridging of a spark between the electrodes of the spark plug 176, in order to cause the ignition of the gas confined in the combustion chamber 175. The first phase to take place within the driving part of the engine is, therefore, a motive phase of gas expansion which begins at the same time as the operative chamber formed between the faces 171b and 172a is reduced in volume and in communication with the exit aperture 182 of the pump. In other words, the delivery phase of the pump part of the engine takes place at the same time. This phase comes to an end, when the volume of the chamber has become zero, which is towards the right angle position in respect of the lower edge 182b of the exit aperture 182 of the pump. At this moment, the chamber formed between the parting faces 171a and 172b of the two pistons is at maximum.

The second phase is the phase of exhaust of the burnt gas through the aperture 178, at the same time as fresh fuel gas enters into the chamber 184 through the intake aperture 177 of the engine. During this second phase, the volume of the chamber 184 increases and reaches its maximum at the moment when the front face 171b of the piston 171 is almost in right angle position to the lower edge 177b of the intake aperture 177 of the engine.

The following phase is a compression phase for the combustion engine and, at the same time, a suction phase for the pump. As far as the combustion engine is concerned, the two faces 171b and 172a of the two pistons gradually approach each other until they finally occupy the position of the two faces 171a and 172b as it is indicated in the drawing at the end of the compression, whilst the two faces 171a and 172b of the pistons, which had approached each other at the beginning of this third phase in an almost right angle position to the lower edge 178b of the exit aperture 178 of the engine, part gradually from each other and form a chamber which communicates with the intake aperture 181 of the pump; at the end of this third phase, the flow of fluid which has passed through the intake aperture 181 of the pump is confined in the chamber formed between the faces 171a and 172b, as indicated at 171b and 172a in FIG. 14, and the entire engine has returned to the same conditions that prevailed at the moment of the beginning of the first cycle described above. During these three operation phases, a permutating interchange of the positions of the sectors has taken place.

When the engine operates according to the described cycle, the interrelations of the various components correspond to the arithmetic progressions given in the following table:

| Numbers of pistons | 2 | 4 | 6 | 8 |
|---|---|---|---|---|
| Ratio gear rim:planet pinion | 3 | 6 | 9 | 12 |
| Number of intake apertures of the pump | 1 | 2 | 3 | 4 |
| Number of delivery apertures of the pump | 1 | 2 | 3 | 4 |
| Number of exhaust apertures of the engine | 1 | 2 | 3 | 4 |
| Number of sparking plugs of the engine | 1 | 2 | 3 | 4 |

FIG. 15 gives an alternative of the constructional example of FIG. 14, in which the engine cycles take place in the same manner as the engine cycles described with reference to FIGS. 10a to 10l, and the pump cycles take place in the same manner as those described with reference to FIGS. 9a to 9l, and in which the spaces enclosed between the different sectors are connected, in alternating succession, to the engine and to the pump.

The diameter of the planet pinions is $1/12$ of the diameter of the gear rim. Departing from the position in which the engine is shown, the first phase to take place begins with the bridging of the spark between the electrodes of the spark plug 276, in order to cause the ignition of the gas which is compressed in the combustion chamber 202, i.e. a phase of expansion of the gas which follows suit for the driving engine part; at the same time, a compression of fresh gas takes place in the chamber 212, the burnt gas escapes into the chamber 222 through the aperture 201, fresh gas is sucked into the chamber 232 through the aperture 211, fluid is drawn for compression into the chambers 242 and 252 through the apertures 221 and 231, and fluid, which has been compressed in the chambers 262 and 272, is discharged through the apertures 241 and 251.

The subsequent phases then repeat in the same manner as it has been explained.

This engine differs essentially from the preceding one, in the fact that each semi-revolution of the planet wheel is equivalent to one motive phase.

The most simplified type of this engine would be of a ratio planet wheel diameter to rim diameter equal to 1/9.

FIG. 16 shows a dual engine which is basically composed of two engines that are assembled on both sides of the plane crossing along the median line X Y, each one of them being of the type shown in FIGS. 1 to 6. Therefore, in FIG. 16, one will note the shaft 305, which carries a toothed planet wheel 345 meshing with two planet pinions 346, 346', which, in turn, engage with the internal toothing of a gear rim 348 integral with the crank case 301 of the engine. At the end of the shaft 305, a pin 307 is fitted, which is centered in a cylindrical joint at the internal end of the pivot 308 in the end flange 303 of the engine. The planet pinion 346 is integral with a first crankshaft fitted with two crank-pins 333, 334 for the drive of two piston couples and, on the other hand, is integral with a second crank-shaft fitted with two crank-pins 333a and 334a, offset by 90° from the crank-pins 333 and 334, which drive two other piston couples arranged at the left-hand side of the engine in the view of FIG. 16. The double crank-shaft is thus supported in two seats 327, 327a which run in the bearings 329, 329a of two integral rings 331 and 331a which rotate on the central pivot 308 and the relative tubular pivot 308a, centered in the other end flange 303a of the engine and integral with the same.

The other planet pinion 346' is secured in an analogous manner to two other double crank-shafts 333', 334' and 333'a, 334'a.

That part of the cylindrical crank case 301 which is in vertical position to the pistons, viz, pistons 311a and 312a, is also provided with an intake and exit aperture, analogous to the apertures 51a to 51f and 52a to 52f, which are in a vertical position to the pistons in the constructional example of FIGS. 1 to 6.

Because of the angular adjustment of the crank-pins, an engine of such a symmetrical design, as related to the plane X Y, where the output is into a common collector, has the advantage of having no dead point, and provides an almost constant fluid lift, since the shaft 305 is driven at a constant speed. Moreover, the power effects are most evenly distributed between the different components of the engine, in particular, over the teeth of the gearings. It must be noted that the sum of the accelerations imposed at a given moment on the piston groups, which are driven by the two staggered crank-shafts, connected to the same planet pinion, is almost constant. This pump enables two separate fluids to be circulated in two different circuits. This engine can be also operated in such a manner that it is rotatably driven by a compressed fluid which acts on the one of the two piston assemblies, whilst the other assembly lifts another fluid. In this case, the shaft 305 is idle, and the gearings virtually have no longer a power transmitting function, but serve simply for the positioning of the pistons.

In addition, this engine may be composed of a combination, at both sides of the plane X Y (FIG. 16), of two engines similar to those shown in FIG. 10, providing an engine in which the dead points are eliminated.

FIG. 17 gives another form of a pump which also has been derived from the one shown in FIGS. 1 to 6, which, in addition to the pistons 411 and 412, comprises a second group of pistons, viz, 411b and 412b, which are arranged along side the former and are integral with them through the core 414 on the same geometric axis.

The pistons which operate in conjunction with the pistons 411b and 412b, are secured to two discs, i.e. a first disc 419 which has the same function as the disc in FIG. 1, and a second disc 419b which is arranged at the other side in regard of the additional pistons 411b a,d 412b. In FIG. 17, the disc 418 has the same function as the disc 18 in the constructional example of FIG. 1.

This particular design provides a pump with only one driving mechanism, but two piston assemblies, which can lift simultaneously two different fluids when the shaft 405 is put into rotation. Apart from this, one can also employ this engine in the same function as the one of FIG. 16, i.e. as a driven engine fed with a compressed fluid and, at the same time, because of its second piston assembly, in the function of a pump or compressor, without using the end of the shaft 405.

One can also design a hydraulic motor-compressor; in this case, the power transmission between the motive parts and the compressor is directed by the core 414 and the disc 419, and the gear means merely position the sectors within the crank case.

FIGS. 18 and 19 show an alternative of the constructional example of FIG. 1, in which the pump operation cycles take place in the same manner as those described with reference to FIGS. 9a to 9l, but the quantitative value of the pistons equals half a base arc less the angle A; the interrelations of the components of this engine can be expressed as follows:

| Number of pistons | 2 | 4 | 6 | 8 | 10 | 12 |
|---|---|---|---|---|---|---|
| Ratio gear rim:planet pinion | 1 | 2 | 3 | 4 | 5 | 6 |
| Number of intake apertures | 1 | 2 | 3 | 4 | 5 | 6 |
| Number of exit apertures | 1 | 2 | 3 | 4 | 5 | 6 |
| Number of basic pump units | 1 | 2 | 3 | 4 | 5 | 6 |
| Number of pulsations of a basic pump unit per revolution of rotor | 2 | 4 | 6 | 8 | 10 | 12 |
| Total number of pulsations per revolution of rotor | 2 | 8 | 18 | 32 | 50 | 72 |

It must be noted that the alternative in which the ratio gear rim diameter to planet pinion diameter equals 1 and 2, do not comply with the general description, as far as the gear means are concerned; for these low ratios, the constructional solution may be such that the planet wheel is stationary at the end of the pivot 8, and the planet pinions are driven by the gear rim secured to the shaft 5. The ratio given in the tables is, in this case, the ratio planet wheel diameter to planet pinion diameter. The eccentricity is limited to a value which provides a variation in the speed of the pistons that is basically sinusoidal.

The mechanical arrangement in this engine differs slightly from the one shown in FIG. 1, in so far as the radial openings 41 are no longer accommodated inside the sectors. In FIGS. 18 and 19, the same symbols are used to denote components of the same function as those already described with reference to FIGS. 1, 2, 3, 4, 5.

This engine can, of course, assume the function of a driving engine, in which case the chamber formed between the two faces of two adjacent pistons follows the same variations in volume as those described with reference to FIGS. 10a to 10l. The sequence of the characteristic data for the driving engine is drawn from those of the pump, but any driving engine alternative must be of an even ratio diameter of gear rim to diameter of planet pinion.

It goes without saying that the combinations of FIGS. 14, 15, 16, 17, are also applicable to the engine of FIGS. 18, 19.

FIG. 20 gives an example of an engine in which the sectors are at different angular values. In the demonstrated alternative, some sectors are of the design like those of the engine according to FIGS. 1 to 6, others in the design like those of the engine according to FIGS. 18, 19. This arrangement enables certain mechanical solutions and certain possibilities as to the closing and opening of the apertures, to be implemented accordingly. This alternative is an example of combinations such as are possible with the different progressions which define the different constructional solutions of the engine.

The major advantage of an engine according to the invention can be summarised as follows:

A volumetric system that is reversible without valves, that is simple in construction and assembly, which contains mechanical devices that are balanced and centered, without lateral or radial effects, with low wear, economising usage of the gearings, where action on the teeth is well balanced as a result of a planet gearing meshing with planet pinions, further, it provides higher rotation speed rates, and easy lubrication, the displacement of the dead points is impossible, higher mechanical output, single power transmission for certain engine combinations are available, the total sum of the forces of inertia of the components that are subjected to varying speed rates, is almost constant, even in the case of engines with shifted coupling arrangements, and sinusoidal acceleration of the components subjected to varying speed rates is afforded.

The components subjected to varying speed rates may be of a low mass and a low moment of inertia. The components that are accelerated in a reverse direction give the same product mass X moment of inertia.

Further, the system may have a compression ratio which is infinite or finite, as desired, without any dead point in reduction of volume, if required, and it can be employed as a vacuum pump, with high output rate as compared with small overall dimensions, and high pressure can be attained within a single stage, suitable filling even with a viscous fluid is possible, and useful surface of the apertures at any given moment is almost proportional to the output at this moment. The fluid does not interfere with the rotation of the rotor, almost constant output is possible in the case of a double-acting engine, with high depression at the intake, and large number of pulsations per revolution.

It affords the possibility to keep fluids separate which are lifted by different basic pump units installed in the same gear case.

Moreover, the system has the features of low internal leakage, proper operation, even at low speed rates, low dynamic losses in the fluid, separation of high or low pressure at any angular position of the rotor, a sealed gear case, and build-up of a counter-pressure in the case of a hydraulic compressor. The oil circulates between the gear case and the operative chambers, in order to ensure the tightness in the case of operation as a vacuum pump, the opportunity of installing sealing segments, using the gear case as a bearing, centering the rotor in relation to the gear case, in order to prevent the pistons from sliding with friction on the inner surface of the gear case.

Additionally, the system is convertible into a rotary engine with a large number of explosions per revolution, with regularity of the torque, no dead point with certain engine connections, and adaptation of the technique of the classic four stroke engine is possible, in particular, as far as the opening and closing of the apertures are concerned. Internal and external cooling systems can also be readily fitted.

It should be noted that the invention is not confined to the constructional examples described and demonstrated, which are purely in the nature of examples, and it goes without saying that numerous modifications are possible as per the intended application, without exceeding beyond the scope of the invention.

I claim:

1. Rotary volumetric machine comprising a housing forming a cylindrically-shaped chamber, a first shaft axially disposed within said chamber, a member rotatably mounted on said first shaft, a pair of angularly spaced first pistons secured to and extending radially outward from diametrically opposed positions on said member, each of said first pistons having a pair of angularly spaced radially extending side surfaces, a pair of spaced support members located within said chamber at the opposite ends of said first pistons and rotatably secured on said first shaft, a pair of angularly spaced second pistons secured to and extending between said support members, said second pistons located on diametrically opposed sides of said first shaft, each of said second pistons having a pair of angularly spaced radially extending side surfaces and each of said second pistons disposed between said pair of first pistons, said side surfaces of said first and second pistons defining sector-shaped cross-sections in a plane transverse to the axis of said chamber, the total arc subtended by said sector-shaped cross sections of said first and second pistons being less than 360°, means for rotating said first and second pistons about said first shaft at relatively periodically variable speeds whereby the adjacent side surfaces of said first and second pistons are cyclically moved away from and toward each other forming therebetween piston chambers of periodically variable volume, and ports in said housing communicating periodically with said piston chambers during the rotation of said pistons for providing inlet and outlet passageways to said piston chambers.

2. A rotary volumetric machine, as set forth in claim 1, wherein said means for rotating said first and second pistons comprises at least one crank shaft, a first crank pin on said crank shaft operatively connected to said first pistons, a second crank pin on said crank shaft operatively connected to said second pistons, and means for rotating said crank shaft.

3. A rotary volumetric machine, as set forth in claim 2, wherein said first shaft is disposed within one end of said chamber, said means for rotating said crank shaft comprises a second shaft positioned at the opposite end for said chamber from and in axial alignment with said first shaft, a planet gear mounted on said second shaft, a planet pinion positioned on said crank shaft in operative engagement with said planet gear for rotating said crank shaft.

4. A rotary volumetric machine, as set forth in claim 3, wherein a pair of said crank shafts are positioned within said chamber, each of said crank shafts arranged eccentric to said second shaft and disposed on diametrically opposite side of said second shaft, a gear rim mounted on the inner surface of said housing in a common plane with said planet gear and planet pinions and in engagement with said planet pinions.

5. A rotary volumetric machine, as set forth in claim 1, wherein said member comprises a sleeve rotatably mounted on said shaft, and said first piston integrally attached to and extending radially outward from said sleeve.

6. A rotary volumetric machine, as set forth in claim 1, wherein said support members comprise a pair of disks arranged transversely of the axis of said chamber concentrically disposed about said first shaft, said second pistons attached to and extending between said disks, and said first pistons freely rotatably about said first shaft between said disks.

7. A rotary volumetric machine, as set forth in claim 6, wherein said first pistons and said second pistons have sector-shaped transverse cross sections of the same size.

8. A rotary volumetric machine, as set forth in claim 1, wherein said first shaft is disposed within one end of said chamber, a second shaft is located within said housing at the opposite end thereof from and in axial alignment with said first shaft, a second member rotatably mounted on said second shaft, a second pair of spaced first pistons secured to said second member and axially spaced from said other pair of first pistons, a pair of second space support members are disposed within said chamber at the opposite ends of said second pair of first pistons and rotatably secured to said second shaft, a second pair of spaced second pistons secured between said pair of second support members, a rotatable shaft extending axially through said chamber to a transverse plane separating the sets of said first and second pistons, a planet gear mounted on said rotatable shaft, a pair of crank shafts located on diametrically opposed sides of said rotatable shaft and operatively connected to both sets of said first and second pistons, and planet pinions mounted on said crank shafts and operatively connected to said pinion gear on said rotatable shaft for rotating said two sets of first and second pistons within said chamber.

9. A rotary volumetric machine, as set forth in claim 1, wherein a second pair of said first pistons are disposed in said chamber axially spaced from said first pair of first pistons, a second pair of said second pistons disposed in coplanar relationship with said second pair of said first pistons, said second pair of first pistons secured to said member at an axially spaced location from the point of attachment thereto of first pair of first pistons whereby both pairs of said first pistons are arranged to rotate together about said first shaft, and said second pair of said second pistons secured to said first pair of said second pistons and being rotatable therewith for rotation within said chamber.

References Cited
UNITED STATES PATENTS 3,139,871   7/1964   Larpent _____ 123—11 X RALPH D. BLAKESLEE, *Primary Examiner.*